United States Patent [19]

Johnston

[11] Patent Number: 4,738,578
[45] Date of Patent: Apr. 19, 1988

[54] BULK MATERIAL RECLAIMING APPARATUS

[75] Inventor: William H. Johnston, Montreal, Canada

[73] Assignee: The CSL Group, Inc., Montreal, Canada

[21] Appl. No.: 793,923

[22] Filed: Nov. 1, 1985

Related U.S. Application Data

[63] Continuation-in-part of Ser. No. 713,724, Mar. 19, 1985, abandoned.

[30] Foreign Application Priority Data

Jan. 29, 1985 [CA] Canada ................................. 473025

[51] Int. Cl.⁴ ............................................. B63B 27/00
[52] U.S. Cl. ..................................... 414/143; 414/145; 198/509; 198/518; 198/703
[58] Field of Search ................ 414/140, 144, 145, 133, 414/313, 143, 139; 198/511, 509, 518, 861.4, 703

[56] References Cited

U.S. PATENT DOCUMENTS

| | | | |
|---|---|---|---|
| 3,144,142 | 8/1964 | Wallace, Jr. | 414/145 |
| 3,349,892 | 10/1967 | Barre | 198/518 X |
| 3,881,590 | 5/1975 | Hartmann | 198/703 X |
| 4,230,220 | 10/1980 | Iino | 414/139 X |
| 4,261,678 | 4/1981 | Kruger | 414/139 X |
| 4,440,537 | 4/1984 | Blattermann et al. | 198/509 X |
| 4,562,918 | 1/1986 | Tschernatsch et al. | 198/509 |

FOREIGN PATENT DOCUMENTS

| | | |
|---|---|---|
| 23240 | 6/1972 | Australia . |
| 30892 | 1/1973 | Australia . |
| 56388 | 5/1973 | Australia . |
| 57690 | 6/1973 | Australia . |
| 57313 | 1/1975 | Australia . |
| 306633 | 4/1973 | Austria . |
| 813737 | 5/1969 | Canada . |
| 0066846 | 12/1982 | European Pat. Off. ............ 414/144 |
| 0111328 | 6/1984 | European Pat. Off. . |
| 272118 | 3/1914 | Fed. Rep. of Germany . |
| 2116694 | 10/1972 | Fed. Rep. of Germany ...... 414/145 |
| 2331136 | 1/1975 | Fed. Rep. of Germany . |
| 2742498 | 3/1979 | Fed. Rep. of Germany . |
| 2910985 | 10/1980 | Fed. Rep. of Germany . |
| 3021853 | 1/1981 | Fed. Rep. of Germany . |
| 1524139 | 5/1968 | France ............................... 414/139 |
| 1427410 | 3/1976 | United Kingdom . |
| 1536538 | 12/1978 | United Kingdom . |

OTHER PUBLICATIONS

Scholtz-Efs-three-page advertising brochure.
Kone Corporation-single page advertisement.
Hartmann Band-Gesellschaft mbH-single page advertisement.

Primary Examiner—Leslie J. Paperner
Assistant Examiner—Jonathan D. Holmes
Attorney, Agent, or Firm—Beveridge, DeGrandi & Weilacher

[57] ABSTRACT

A cargo reclaiming apparatus that may be fitted to a ship for emptying bulk solid material from the holds or to a warehouse for emptying such material from storage bins. The apparatus has a gantry movable across the top of the storage containers, a rotatable structure mounted to the gantry, and a boom supported by and extending from the rotatable structure at a selectable angle. The boom has a digging wheel at its outer end for feeding material to the inner surface of a belt encircling the boom. The material passes through the rotatable structure and gantry and is fed to a collection location. The belt on the boom may carry material from the container even when the outer end of the boom is positioned above the end of the boom connected to the rotatable structure.

12 Claims, 11 Drawing Sheets

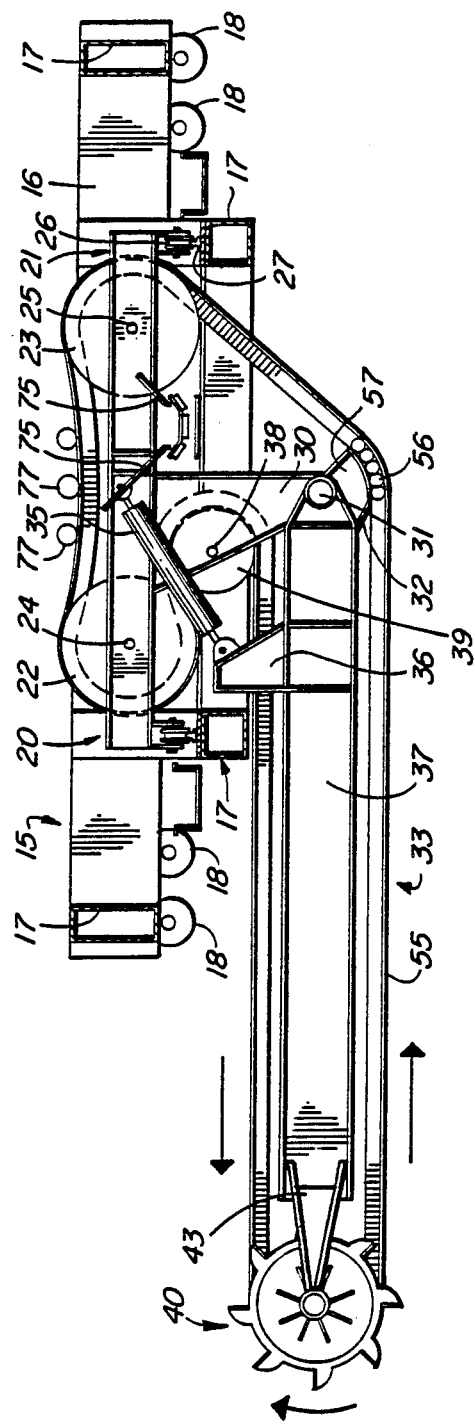
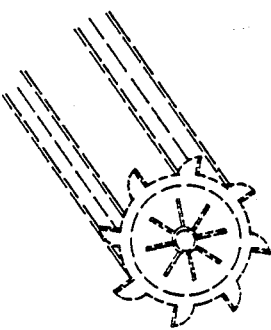
FIG. 2

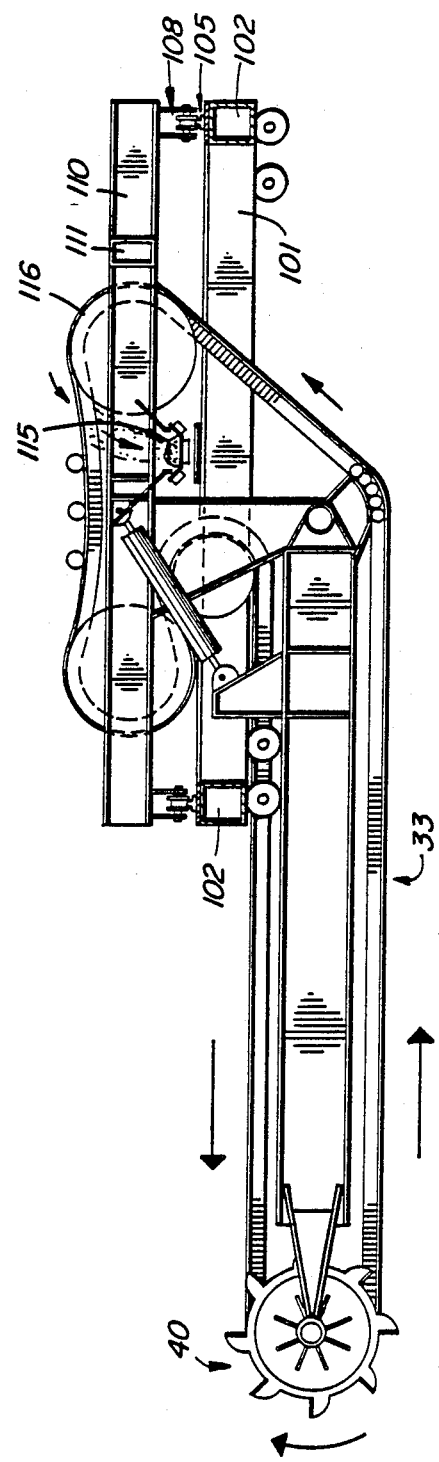
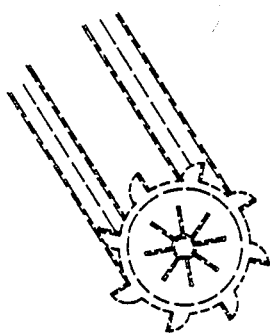
FIG. 4

BULK MATERIAL RECLAIMING APPARATUS

This application is a continuation-in-part of application Ser. No. 713,724 filed Mar. 19th, 1985 now abandoned.

This invention relates to an apparatus for reclaiming bulk solid material from a container, and more particularly, to an apparatus adapted to move across the top of the container and having a boom extendable into the container with a bucket wheel on the end of the boom.

Canadian Pat. No. 813,737, granted to Marcel J. C. Barre on May 27th, 1969, relates to an apparatus for reclaiming bulk material from the hold of a ship The apparatus includes a gantry mounted on a track on a wharf, an arm connected to the gantry and extending generally horizontally over the wharf and above a ship berthed at the wharf, and a boom connected to extend generally vertically from the end of the arm into the hold of the ship. Bulk solid material in the hold of the ship is scooped into buckets on the periphery of a wheel rotating on the lower end of the boom and falls into pockets positioned on the inner surface of a belt extending longitudinally around the boom. The pockets are discretely connected to the belt and shaped such that only those pockets on the upwardly-moving portion of the belt are capable of retaining material therein. Selective articulation of the arm and the boom orientation relative to the arm, coupled with movement of the gantry on its track on the wharf, allow a range of movement for the wheel on the lower end of the boom.

Bucket wheels of the type illustrated in the Barre patent were previously known to the art. For instance, German Pat. No. 272,118, granted to G. E. A. Schwander on Mar. 2nd, 1913, discloses a wheel comprising four arcuate scoops each adapted to collect material at the bottom of the wheel and laterally expel that material onto an adjacent belt after rotating to the top of the wheel. British Pat. No. 1,427,410 discloses a more sophisticated bucket wheel functioning in a similar manner to place scooped material onto an adjacent belt, the wheel being rotatably secured to an arm projecting from a large vehicle and the belt extending along that arm. A similar digging wheel and associated conveyor arrangement appears in German Offenlengungsschrift No. 2,331,136 which was published on Jan. 16th, 1975. Austrian Pat. No. 306,633, granted on Apr. 25th, 1973 to B. Hillinger and J. Weihs, discloses a bulk solid material reclaiming apparatus comprising a similar gantry, connected arm, and depending boom arrangement as in the aforementioned Canadian Pat. No. 813,737, a pair of bucket wheels on the lower end of the boom being adjacent a pair of conveyor belts extending along opposite sides of the boom. Each of the belts on the boom have a series of outwardly-facing buckets which pass adjacent to the discharge location of the adjacent bucket wheel. German Pat. No. 2,742,498, granted to Weiner BruckenbauUnd Eisenkonstruktions-AG on March 29th, 1979, and German Patent No. 3,021,853, granted to Weiner BruckenbauUnd Eisenkonstruktions-AG on Sept. 8th, 1983, both disclose a pair of bucket wheels extending on opposite sides of a lower end of a boom around which extends a series of pivotal trays.

The subject invention is an apparatus for reclaiming bulk solid material from a storage container; such a storage continer might be the hold of a ship or a bin in a warehouse. The apparatus comprises a gantry adapted to be mounted on a track proximate to the top of the storage container for moving across the container. It also comprises a rotatable structure adapted to be mounted to the gantry to rotate on the gantry around a vertical axis. The apparatus further comprises a boom adapted to be pivotally mounted at its one end to the rotatable structure to pivot on the rotatable structure around a horizontal axis. The boom is adapted to extend at a selective upward or downward angle from the rotatable structure. The apparatus still further comprises a belt adapted to encircle the boom longitudinally and be supported in its passage around the other end of the boom by a rotatable drum. The belt has a pair of flexible side members extending along its inner surface generally perpendicular to that inner surface. Each flexible side member extends parallel to but spaced from a respective edge of the belt, and the belt is adapted to be supported in its movement around the drum by a pair of annular members extending from opposite ends of the drum. That edge portion of the inner surface of the belt extending between a flexible side member and the respective edge of the belt is adapted to ride on a respective one of the annular members during movement of the belt around the drum. A series of slat members extends between the flexible side members generally perpendicular to the inner surface of the belt. The slat members are generally equally spaced from each other so as to form a series of generally equal-sized compartments along the inner surface of the belt. The apparatus still further comprises a scoop means adapted to be rotatably secured to the other end of the boom at a position laterally offset from the belt. Material gathered by the scoop means during its rotation is deposited on the inner surface of the belt as the belt moves around the drum on the other end of the boom. The material is retained in the compartments along the inner surface of the belt as the belt moves along the boom extending at the selective upward or downward angle.

The belt may be adapted to be supported in its passage around the one end of the boom by a rotatable drum means which is adapted to be mounted on the rotatable structure. The drum means comprises first and second drums each of which have a pair of annular members extending from its opposite ends for supporting the belt. Each edge portion of the inner surface of the belt that extends between the flexible side member and the respective edge of the belt is adapted to ride on a respective one of the annular members of each of the first and second drums during movement of the belt around those drums. The first and second drums are adapted to be positioned on the rotatable structure such that material retained in a compartment along the inner surface of the belt is emptied from that compartment as the compartment moves between the first and second drums. The belt is also supported in its passage around the one end of the boom by a third drum adapted to be rotatably mounted to the apparatus proximate of the one end of the boom. The outer surface of the belt is adapted to ride on the third drum to support the belt in its movement from the drum means to the other end of the boom.

The one end of the boom may have a double series of rollers adapted to be mounted thereon to support the belt in its movement from the other end of the boom to the drum means. Each edge portion of the inner surface of the belt that extends between the flexible side member and the respective edge of the belt is adapted to ride on a respective one of the double series of rollers. The apparatus may also comprise hydraulic piston means, the hydraulic piston means being adapted to extend between the rotatable structure and the boom. The angle at which the boom extends relative to the rotatable structure is selected by actuation of the hydraulic piston means.

In one form of the apparatus of the invention, the drum means and boom are adapted to be mounted to the rotatable structure such that the plane of the path of the belt is offset from the axis of rotation of the rotatable structure. In this form of the invention, the apparatus also comprises a second belt adapted to be mounted on the rotatable structure to rotate between and below the first and second drums, that second belt being adapted to be oriented generally normal to that portion of the belt extending between the first and second drums. The second belt is adapted to collect the material emptied from the compartments of the belt, and the second belt in turn is adapted to empty the material along the axis of rotation of the rotatable structure. In this form of the invention, the apparatus further comprises a third belt adapted to be mounted to rotate on the gantry, the third belt being adapted to be positioned so as to collect the material emptied from the second belt and empty the material along the one side of the gantry. The apparatus is adapted to be used in association with a belt means extending parallel to the track of the gantry, that belt means being adapted to collect the material emptied from the third belt and deposit it proximate of one end of the track.

In this one form of the invention, the rotatable structure of the apparatus is adapted to be laterally offset on the gantry. That offset is in the opposite direction to that at which the plane of the path of the belt is offset from the axis of rotation of the rotatable structure when that plane extends parallel to the track of the gantry. The lateral offset of the rotatable structure is sufficient to allow the boom when at an appropriate downward angle to be rotated from one direction parallel to the gantry track to the opposite direction. The rotatable structure may be adapted to rotate through a path of 255 degrees on the gantry.

In an alternate form of the invention, the drum means and boom of the apparatus are adapted to be mounted to the rotatable structure such that the plane of the path of the belt extends through the axis of rotation of the rotatable structure. In this form of the invention, the apparatus also comprises a second belt adapted to be mounted on the rotatable structure so as to rotate between and below the first and second drums. The second belt is adapted to be oriented generally normal to that portion of the belt extending between the first and second drums and is adapted to collect the material emptied from the compartments of the belt. The second belt is adapted to empty the material along a circular path centred on the axis of rotation of the rotatable structure. In this form of the invention, the apparatus also comprises a rotatable collection means adapted to be rotatably mounted to the gantry so as to rotate around the axis of rotation of the rotatable structure. The material emptied from the second belt falls onto the rotatable collection means which is adapted to roate such that material thereon is emptied therefrom at one angular position. In this alternate form of the invention, the apparatus is adapted to be used in association with a belt means extending parallel to the track of the gantry. The belt means is adapted to collect the material emptied from the rotatable collection means and deposit it proximate of one end of the track.

In the alternate form of the invention, the rotatable collection means of the apparatus may be a rotary conveyor, and the apparatus may further have a guide means extending across the surface of the rotary conveyor at the one angular position. The guide means empties material from the rotary conveyor by forcing the material to move normal to the path of the rotary conveyor. In the alternate form of the invention, the apparatus may be capable of complete rotation on the gantry when the boom is at an appropriate downward angle.

The storage container may be the hold of a ship and the track of the gantry may extend longitudinally on the ship proximate of the main deck. A superstructure may be adapted to extend longitudinally on the ship to cover the apparatus. Movement of the belt on the apparatus in use may result from rotation of the third drum by a drive means. The scoop means may rotate in a direction opposite to that in which the belt rotates around the drum at the other end of the boom.

In a further alternate form of the invention hereinbefore described, the boom is pivotally mounted to a boom support structure rather than to the rotatable structure. The boom support structure is mounted to move on a track on the gantry in a direction generally normal to the direction in which the gantry is adapted to move across the container. As applied to the structure of a ship, the boom support structure is adapted to move laterally relative to the ship on a gantry which itself is adapted to be mounted to move longitudinally on the ship.

The belt that encircles the boom of the reclaiming apparatus may be adapted to be supported in its passage around the boom support structure not only by the pair of drums previously described but also by a central drum adapted to be rotatably mounted to the boom support structure generally intermediate of the pair of drums. Whereas the outer edge of the inner surface of the belt is adapted to be carried on annular members extending from opposite ends of the pair of drums, the outer surface of the belt is adapted to ride on the central drum. During use of the apparatus, bulk solid material being carried in one of the compartments on the belt is emptied from the compartment as the compartment moves between the first and central drums. The belt may also be adapted to be supported in its passage around the boom by a second drum assembly, the second drum assembly being adapted to be rotatably mounted to the boom. The outer surface of the belt is adapted to ride on the second drum assembly, the belt being supported by the second drum assembly during its movement from the first drum assembly to the other end of the boom.

The second drum may be adapted to slide on the boom support structure in a direction generally toward or away from the first drum. The position of the second drum relative to the first drum is adapted to vary with the relative position between the boom and the boom support structure. A force of fixed magnitude is adapted to be continuously applied to the second drum in the direction generally away from the first drum to create a generally constant amount of tension on the belt for all positions of the boom relative to the boom support structure.

The belt tensioning arrangement of this disclosure, involving first and central drums in combination with a second drum capable of sliding generally toward or away from the first drum and on which a force of fixed magnitude is adapted to act, may also be adapted for use with the rotatable structure of the principal disclosure. It is also possible for the boom construction described in the principal disclosure to be utilized with the boom support structure described in this supplementary disclosure.

The invention will now be more fully described by means of three preferred embodiments, utilizing the accompanying drawings, in which:

FIG. 2 is a side view of the first embodiment of the invention.

FIG. 4 is a side view of the second embodiment of the invention.

Figure 1:
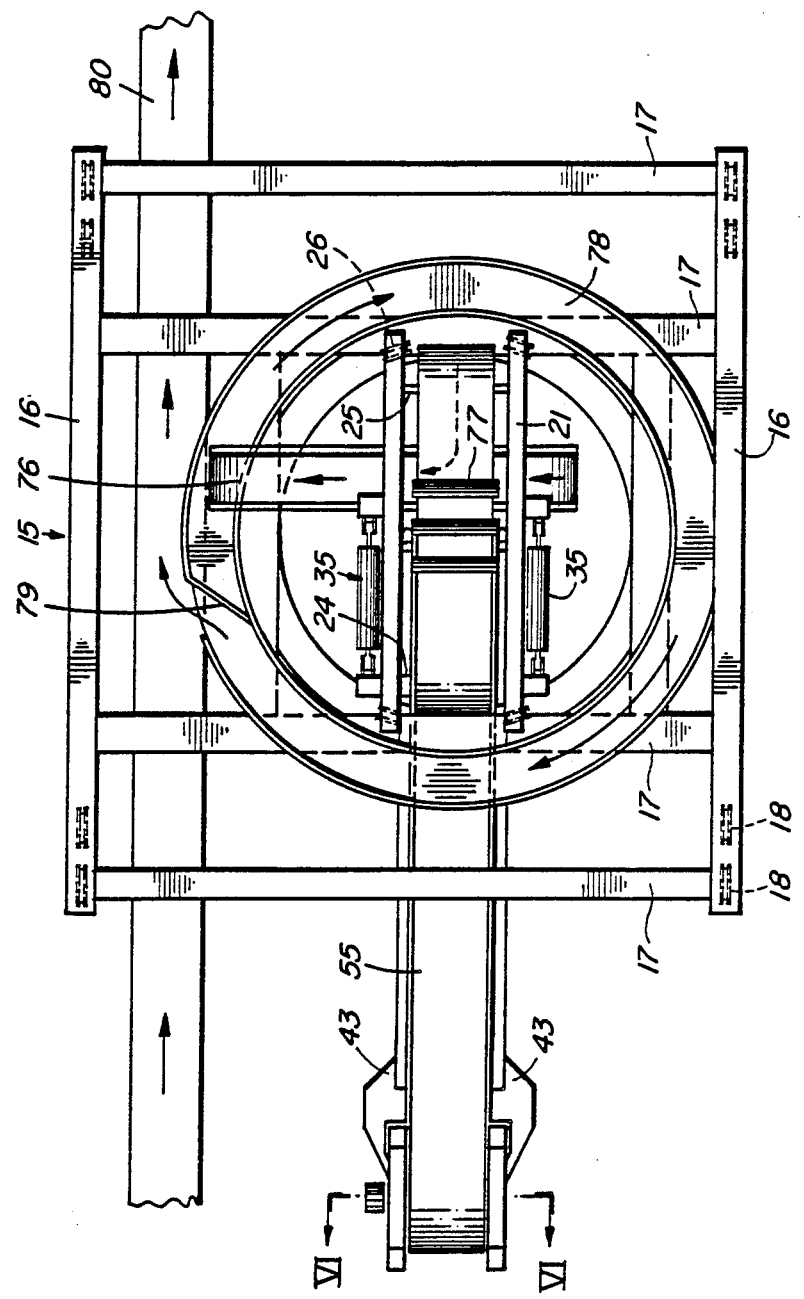
FIG. 1 is a plan view of the first embodiment of the invention.

With reference to FIG. 1, the first embodiment of the invention comprises a gantry generally designated as 15 and formed by a pair of parallel side members 16 and connecting transverse members 17. Each end of each side member 16 has a pair of wheels 18 mounted to the underside thereof, the eight wheels 18 being adapted to ride upon a pair of tracks mounted to the frame of a ship so as to extend above the cargo holds of the ship. The position of the apparatus relative to the cargo holds of a ship will be made more clear with reference to FIG. 5. The apparatus could also be fitted to ride above storage bins in a warehouse, but the preferred embodiments will concentrate on its application to reclaiming bulk solid material from ships.

Rotatably supported on gantry 15 is a rotatable structure 20, that structure comprising a pair of parallel beams 21 connected by suitable lateral connecting members (not shown). A first drum 22 and a second drum 23 are mounted on axles 24 and 25, respectively, to the beams 21, as shown in FIGS. 1 and 2. At each end of beam 21 a wheel 26 is mounted to ride on a circular track 27 secured to gantry 15. Drive means is connected to one of the wheels 26 such that the angular orientation of rotatable structure 20 can be selectively adjusted relative to gantry 15.

Extending generally perpendicular to each beam 21 of rotatable structure 20 is a strut 30, as shown in FIG. 2. An eye is formed in that end of each strut 30 removed from beam 21, the eye having an axle 31 mounted therethrough. Axle 31 in turn extends through an eye 32 at one end of a boom generally designated in FIGS. 1 and 2 as 33. The angular orientation between boom 33 and rotatable structure 20 is controlled by the actuation of a pair of pistons 35 extending therebetween. Each of the pistons 35 extends from a pivotal connection on a respective one of the beams 21 to a pivotal connection on a strut 36 of a respective one of a pair of parallel boom arms 37, the boom arms 37 being secured together by lateral brace members (not shown). Extending between the pair of parallel struts 30 of rotatable structure 20 is an axle 38 on which is mounted a third drum 39.

Figure 6:
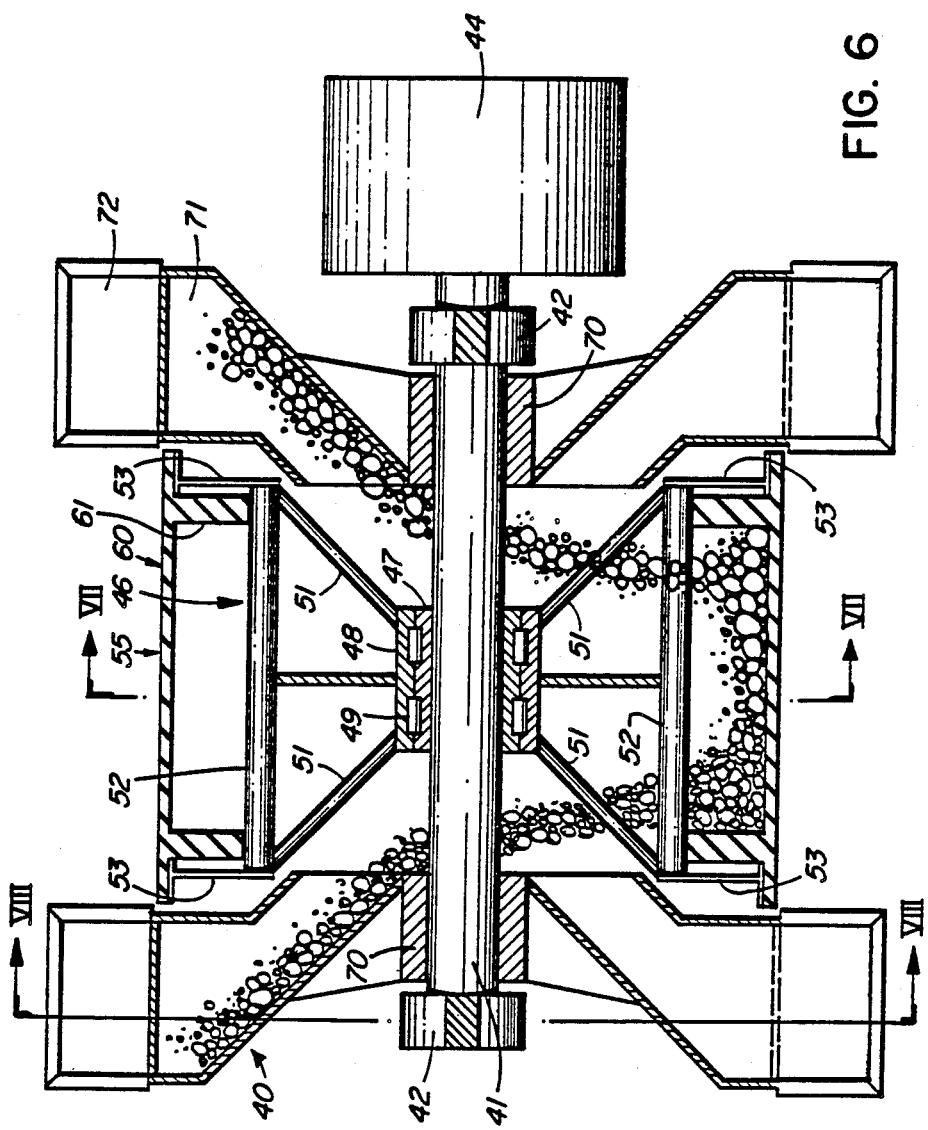
FIG. 6 is a partially sectioned diametric view of the bucket wheel of the apparatus of the invention, that view being taken along Section VI—VI of FIG. 8.
Figure 7:
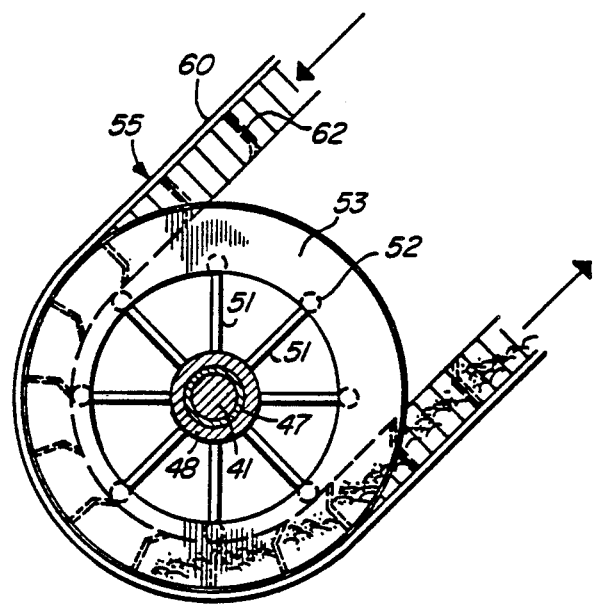
FIG. 7 is a sectioned side view of the bucket wheel of FIG. 1, that view being taken along Section VII—VII of FIG. 6.
Figure 8:
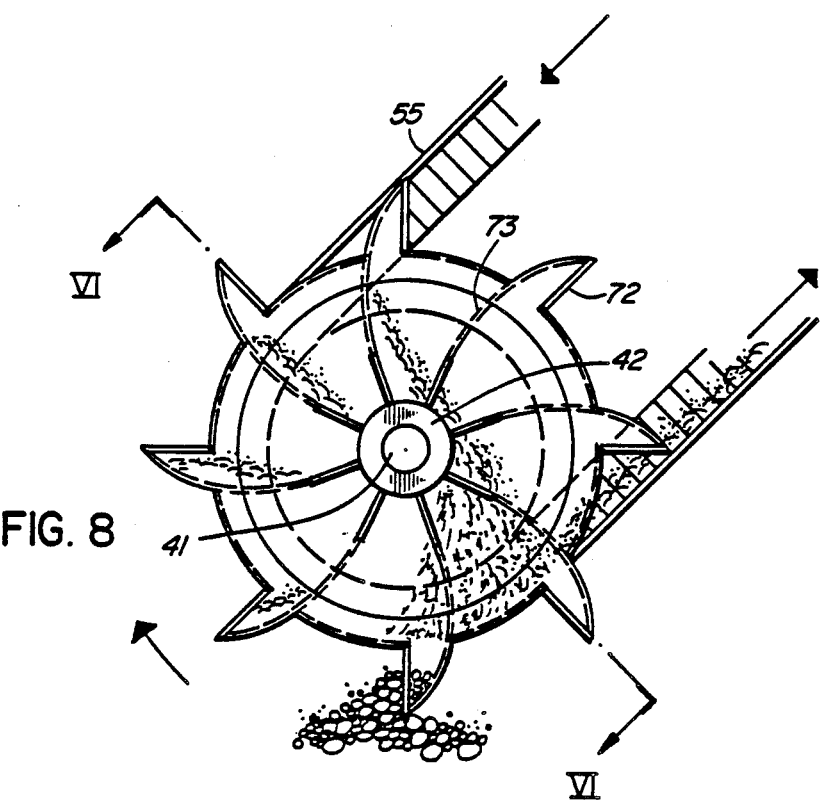
FIG. 8 is a sectioned side view of the bucket wheel of FIG. 1, that view being taken along Section VIII—VIII of FIG. 6.

Rotatably secured to the other end of the boom 33 so as to extend between the outer ends of the pair of boom arms 37 is a bucket digging wheel generally designated as 40. FIGS. 6, 7, and 8 illustrate the general construction and operation of bucket digging wheel 40. It comprises an axle 41 extending between the collar ends 42 of winged projections 43 of the boom arms 37. A pulley 44 is connected to one end of axle 41, that pulley 44 being adapted to be connected to a motor (not shown) through a drive belt (not shown).

A drum generally designated as 46 is mounted to freely rotate on axle 41, as shown in FIG. 6. Such free rotation is accomplished by means of the roller bearing illustrated in FIG. 6, an inner portion 47 of which is secured to axle 41 and an outer portion 48 of which freely moves relative to portion 47 by means of intermediately-positioned bearings 49, the outer portion 48 of the bearing representing the effective axle of drum 46. Extending radially and laterally outward from six angular positions around the outer portion 48 of the roller bearing are spokes 51, the outer end of each angularly corresponding pair of spokes 51 connecting with an opposite end of a respective lateral support arm 52. As shown in FIG. 7, eight lateral support arms 52 are present in drum 46. Secured to the corresponding ends of the eight support arms 52 is an annular bracket 53 formed by an annular disc having a ring integrally connected to its outer edge.

The pair of annular brackets 53 support a heavy rubber belt generally designated 55 in its passage around drum 46. As can be seen from FIG. 2, belt 55 extends around drums 22, 23, 39, and 46, and also around a double series of rollers 56, each series of rollers 56 being connected by a strut 57 to a respective boom arm 37. Each of the drums 22 and 23 have a similar construction to drum 46, the drums 22 and 23 each having a pair of annular brackets similar to annular brackets 53.

Figure 9:
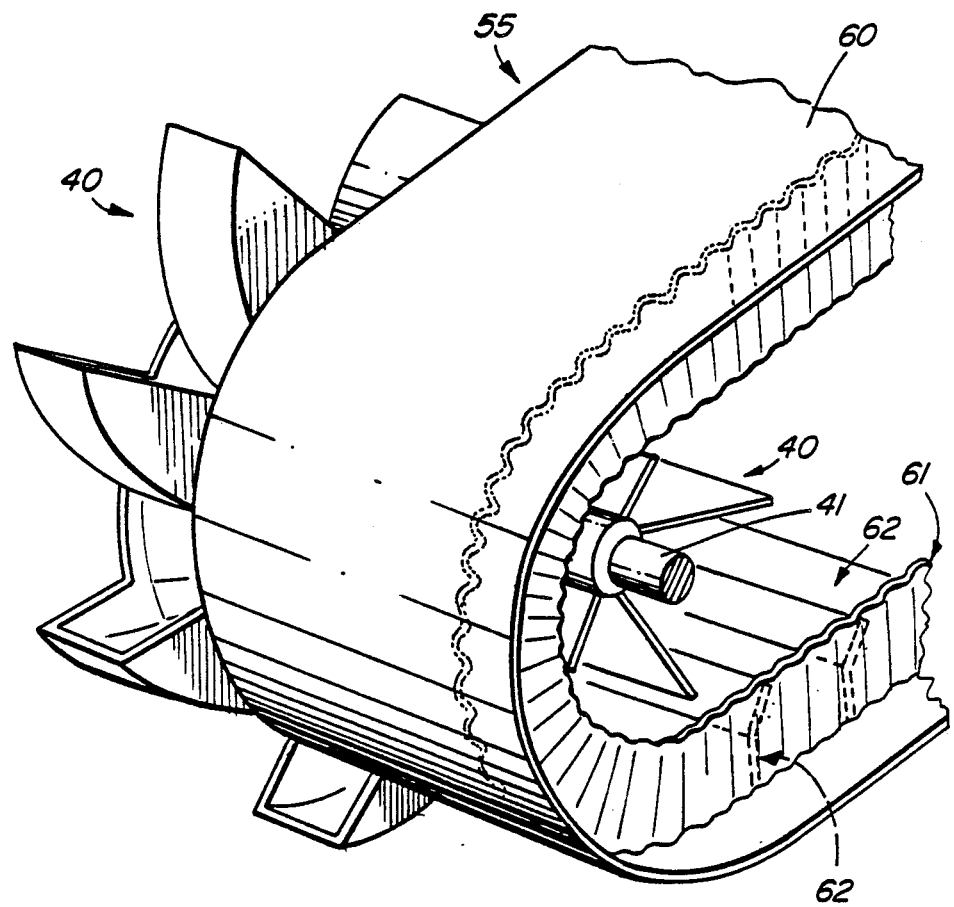
FIG. 9 is a perspective view of a portion of the belt of the apparatus of the invention, the view illustrating the flexibility of the belt as it moves around a drum.

The construction of belt 55 can best be seen in FIG. 9. Belt 55 consists of a lateral load-bearing portion 60 and a pair of pleated flexible sides 61, sides 61 each extending normal to and offset from a respective edge of load-bearing portion 60. As can be seen from FIG. 6, the offset is generally equivalent to the width of the cylinder portion of the annular bracket 53. The flexibility of the belt allows it to extend around a drum with the flexible sides 61 extending either inwardly, as for instance with drum 46 in FIG. 6, or outwardly, as is the case with drum 39 illustrated in FIG. 2. The series of rollers 56 supported by strut 57 serve a similar purpose to the annular bracket 53. The belt 55 has a series of slats 62 extending normal to both its load-bearing portion 60 and its flexible sides 61, as can be seen in FIGS. 7 and 9. Each of the slats 62 is secured by a series of bolts and an angle bracket to the load-bearing portion 60 of belt 55. The outer tip of each slat 62 has a slight curvature, as can be seen in FIG. 7. The described belt is commercially available from at least one source. The known source is Scholtz-EFS GmbH of Hamburg, West Germany. The belt itself is identified by that company as Flexowall ® belting.

With reference to FIG. 6, it can be seen that the bucket wheel generally designated as 40 comprises a pair of wheels each secured to an opposite end of axle 41 to rotate therewith. Each wheel has an axle shaft 70 integrally connected to eight equiangularly positioned hollow scoop channels 71. Each scoop channel 71 has a rectangular mouth 72 connected to an arcuate guide surface 73 which directs material entering the mouth 72 radially and laterally inward on the wheel. The scoop action of the bucket wheel is best illustrated in FIG. 8. As shown in that Figure, the wheel is rotating clockwise while the belt 55 is rotating counterclockwise. In that regard, it should be noted that the belt 55 is being driven by rotation of drum 39 which in turn is driven by a motor (not shown). As can be seen in FIG. 8, material enters the mouth 72 of one of the scoop channels 71 and passes along that scoop channel as the wheel rotates clockwise, the material sliding from the other end of the scoop channel after the wheel has turned approximately one-half turn. The material passes both radially and laterally inward on the bucket wheel and falls into the compartments defined on belt 55 by the flexible sides 61 and slats 62 of that belt as shown in FIG. 6. As can then be appreciated from FIG. 2, the material is then carried toward rotatable structure 20 on boom 33, the belt 55 changing its direction with passage around rollers 56.

The material remains on belt 55 during passage of the belt around drum 23. Unlike drum 46, drum 23 has a cylindrical member interfacing with the inner edge of the flexible sides 61 such that material cannot fall into the centre of drum 23. The material is thus retained in the compartments of belt 55 until that belt moves away from the cylindrical member of drum 23. At that point the material sitting on the surface of the cylindrical member of drum 23 falls under gravity onto the guide members 75 illustrated in FIG. 2, those guide members directing the material onto a belt 76 extending generally normal to belt 55. Belt 76 is illustrated in plan view in FIG. 1. With further reference to FIG. 2, a series of rollers 77 are illustrated; the position of those rollers is adjustable so as to assist material in emptying onto belt 76.

As can be seen in FIG. 1, material carried on belt 76 is deposited on a rotary conveyor 78 which is driven in a continuous clockwise direction. Since the belt 76 is fixed to rotatable structure 20 and rotates with the remainder of that structure on gantry 15, the outer end of belt 76 describes a circular path, and material is emptied from that belt onto the circular path defined by rotary conveyor 78. Material on rotary conveyor 78 is directed radially outward off that belt by a barrier (or plough) 79 extending at an angle thereacross. The material directed off of rotary conveyor 78 falls onto an elongated belt 80 which does not form part of the apparatus of the invention. The belt 80 carries the material longitudinally on the ship and deposits it into a hopper feeding equipment which carries the material off of the ship. A similar arrangement would be utilized if the apparatus were fitted for emptying storage bins in a warehouse.

Figure 3:
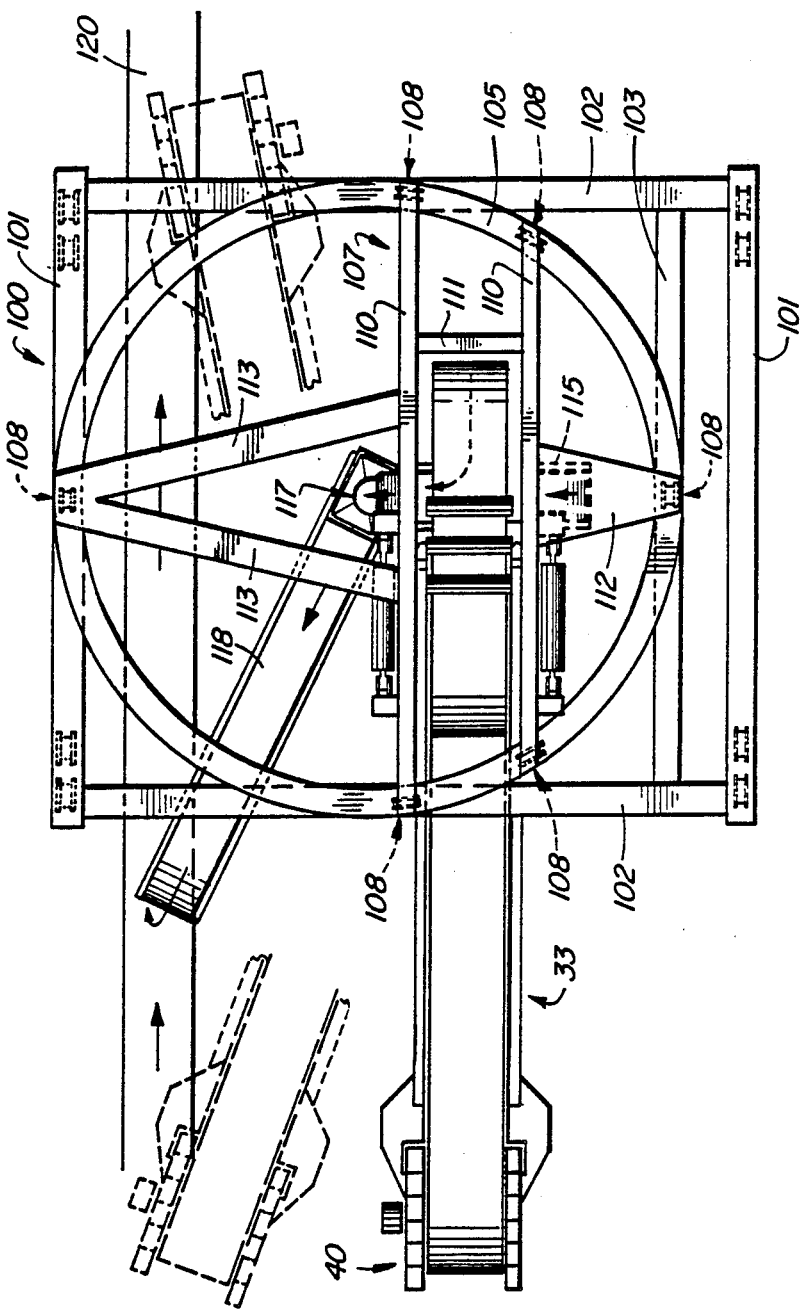
FIG. 3 is a plan view of the second embodiment of the invention.
Figure 5:
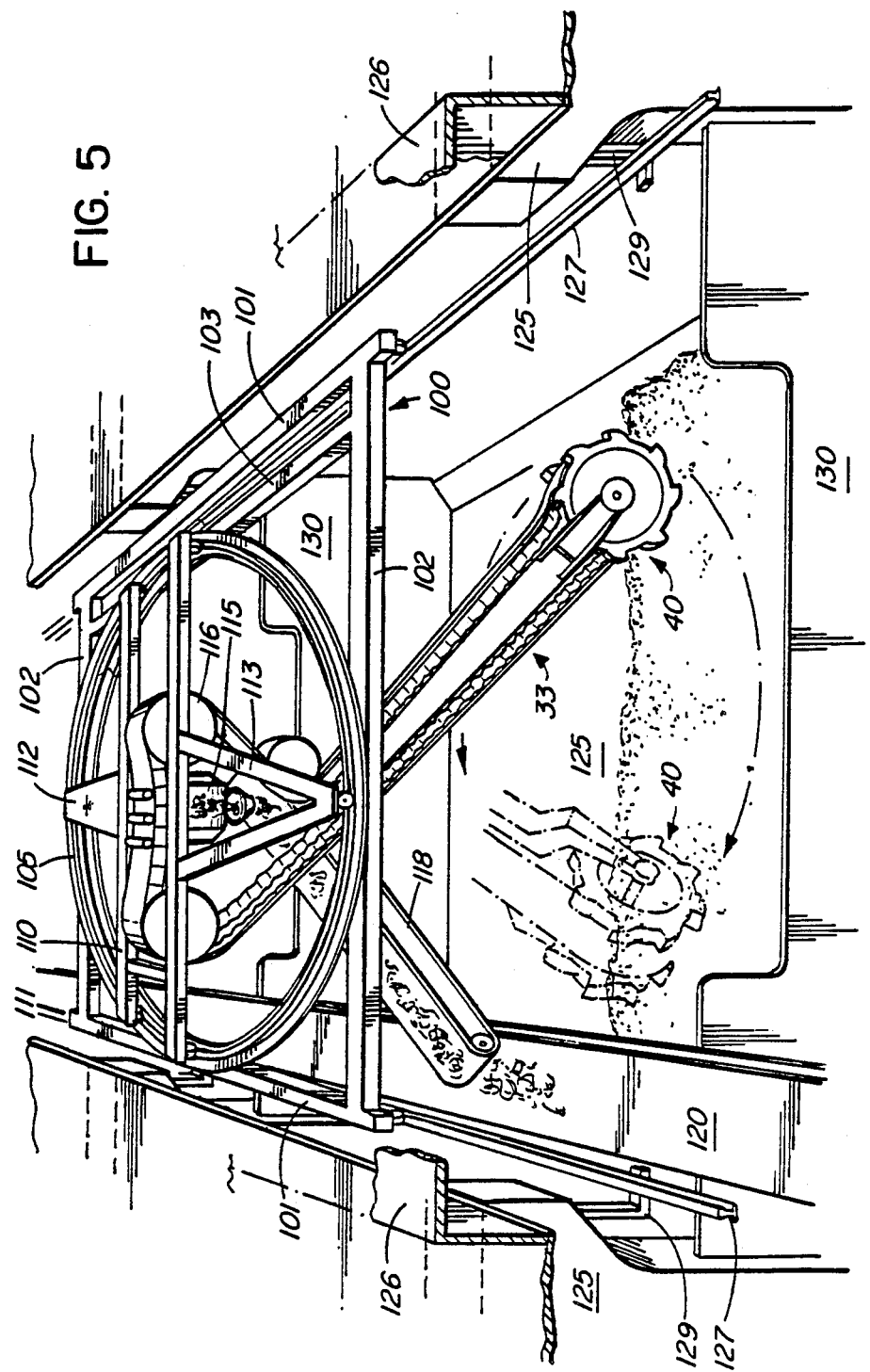
FIG. 5 is a perspective view of the cargo area of a ship having the second embodiment of the invention fitted therein.

FIGS. 3, 4 and 5 illustrate a second embodiment of the apparatus of the subject invention. The gantry, which is generally designated as 100, has a pair of parallel side members 101 connected by a pair of lateral brace members 102. A longitudinal brace member 103 extends between the lateral brace members 102, as shown in FIG. 3. Mounted to one of the side members 101, the longitudinal brace member 103, and the two lateral brace members 102 is a circular track 105. A rotatable structure generally designated as 107 is rotatably mounted on track 105 by means of six wheels 108, as shown in FIG. 3. The frame of rotatable structure 107 comprises a pair of parallel beams 110, a lateral brace member 111 extending therebetween, a small lateral support member 112, and a larger V-shaped support member 113. As seen in FIG. 3, the frame of the rotatable structure is skewed with respect to the position of track 105; the reason for such arrangement will subsequently become obvious. One of the wheels 108 is mounted to each end of each of the beams 110, a further wheel 108 is mounted to the outer end of the support member 112 and the sixth wheel 108 is mounted to the outer end of support member 113.

As with the first embodiment of the apparatus, material is collected into the compartments of belt 55 as that belt moves adjacent to bucket wheel 40. In the case of the second embodiment, the material drops onto belt 115 after the belt has passed around drum 116. With reference to FIG. 3, the material on belt 115 is emptied into a funnel 117 adjacent one end of a belt 118, belt 118 extending at an angle toward one side of the gantry. The belt 115 rotates with rotatable structure 107, whereas the belt 118 is secured to the frame of gantry 100 and does not rotate with rotatable structure 107. The funnel 117 and the adjacent ends of belts 115 and 118 are all positioned on the axis of rotation of rotatable structure 107 such that the belt 115 feeds belt 118 at all relative angular positions between the two belts; the reason for the skewed structure of rotatable structure 107 should now be more evident. Serving a similar function as belt 80 of the first embodiment, a belt 120 deposits the material emptied onto it by belt 118 at one end of the cargo holds of the ship, from which point the material is removed off of the ship.

FIG. 3 illustrates three angular positions for the boom 33. The two positions shown in outline on FIG. 3 are generally the extreme positions that the boom may assume in the hold of the ship. The boom can, however, rotate between those positions through an angle of approximately 255 degrees, the boom being capable of rotating longitudinally from one direction in a hold to the opposite direction when extending into the hold at a sufficiently downward angle.

FIG. 5 illustrates the aparatus of the second embodiment of the invention fitted within the complementary structure of a ship having holds for bulk solid material. Similar complementary structure would be built in a warehouse if the apparatus were employed to empty storage bins therein. In FIG. 5, the hull of the ship in which the apparatus of the invention has been fitted is designated as 125, and 126 respresents the top of a superstructure which has been added to the deck of the ship to cover the apparatus. The apparatus itself is supported by its eight wheels riding on a track 127 extending above the holds of the ship and having a length equal to the combined length of those holds. Track 127 is suspended from the deck fram structure by a series of vertical support arms 129 each of which have a lateral member (not shown) secured to its lower end and extending inwardly under track 127. A pair of adjacent bulk heads 130 defining a cargo hold of the ship are illustrated in FIG. 5, the ship having a number of such bulk heads along its length each adjacent pair defining a hold of the ship. The boom 33 can be raised to an upward position such that the bucket wheel 40 sits between the pair of tracks 127 and above the top of the bulk heads 130. If need be, the top of the bulk heads 130 may be made higher and a contour made in the central portion for passage of boom 33 and bucket wheel 40 therethrough. When a hold of the ship is essentially full of material, the boom 33 may extend horizontally or upwardly during initial emptying of the hold. In such configuration, the apparatus of the subject invention is still capable of retaining material on belt 55 as that belt passes along the underside of boom 33. As previously discussed, the boom 33 is capable of rotating from one longitudinal direction once sufficient material has been removed from a hold that the boom 33 can extend at a sufficiently downward angle for bucket 40 to clear the sides of the ship. The boom 33 of the first embodiment of the invention is capable of completely rotating within the hold of the ship, whereas the boom of the second embodiment of the invention is capable of rotating only through an angle of approximately 255 degrees; the boom 33 of the second embodiment of the invention is capable of rotating longitudinally from one direction in the ship to the opposite longitudinal direction past only one side of the ship due to its particular structural configuration. Belt 120 is positioned approximately level with track 127 and has a length approximating the aggregrate length of the holds of the ship.

Figure 10:
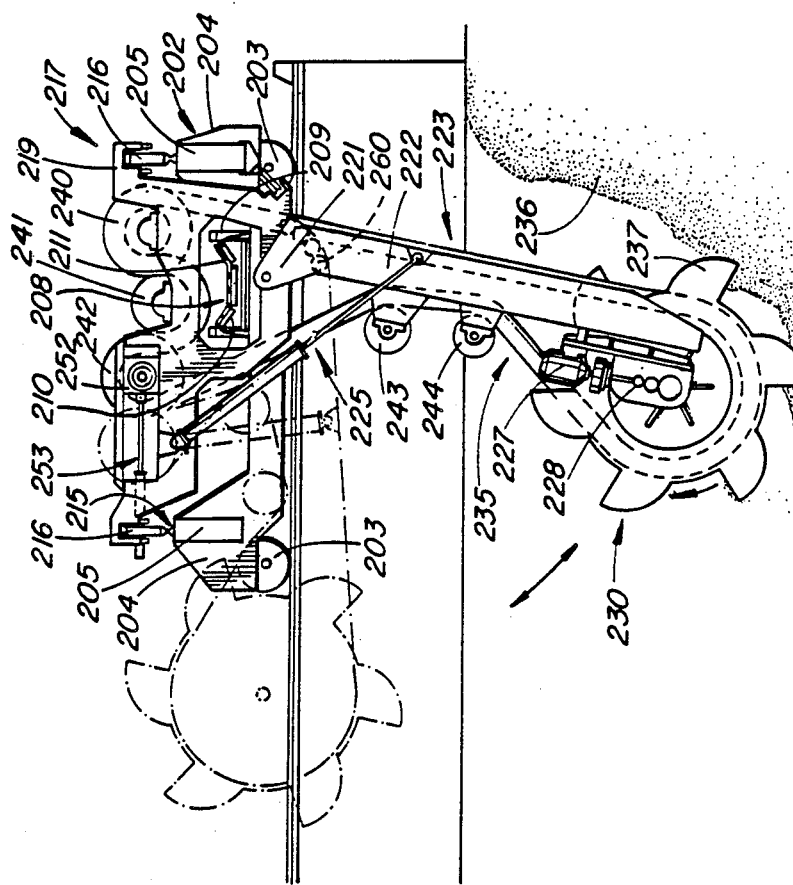
FIG. 10 is a side view of the third embodiment of the invention, the solid lines illustrating the boom in the lowered position in a bulk solid material container and the broken lines illustrating the boom in the raised position.
Figure 11:
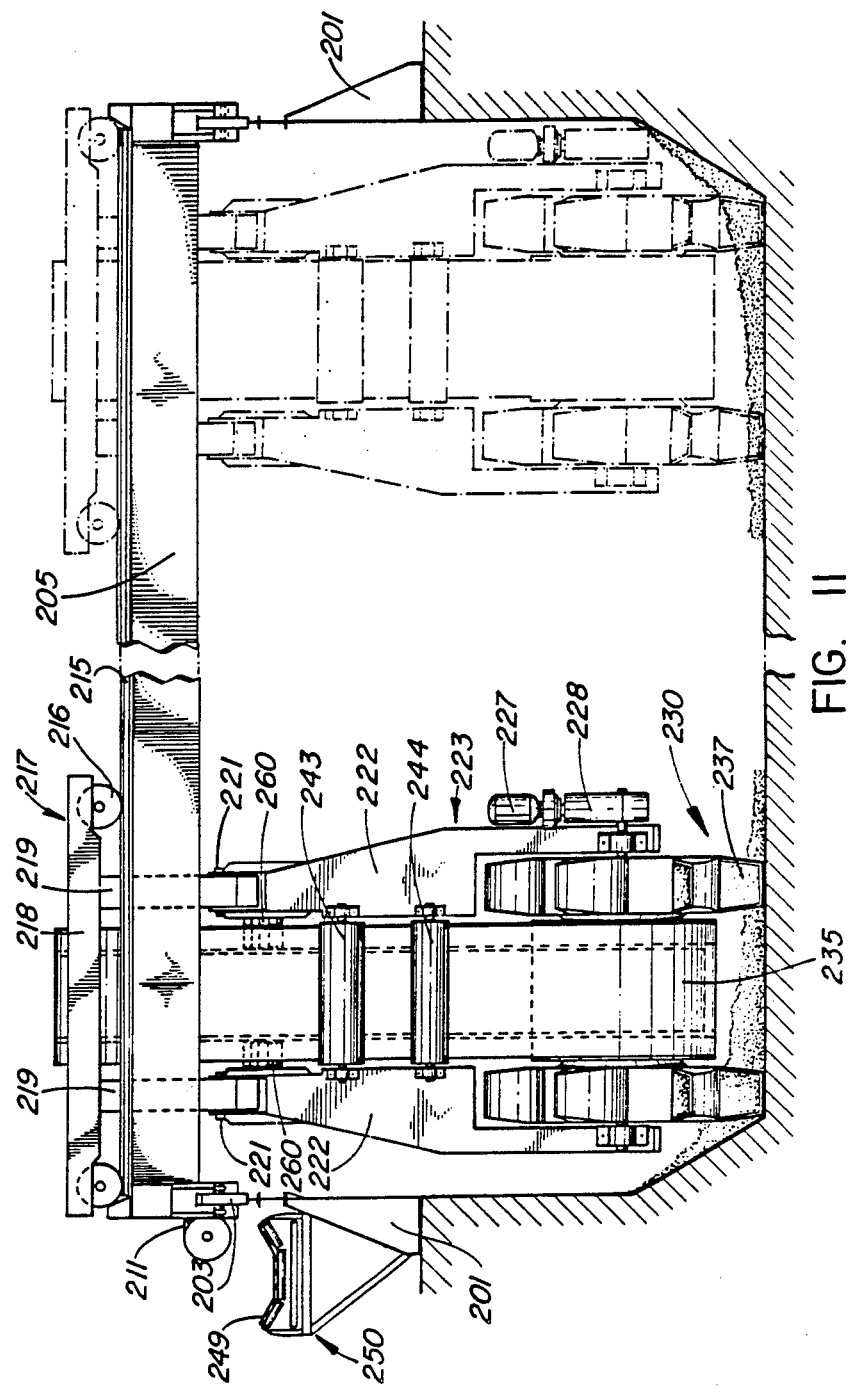
FIG. 11 is a front view of the third embodiment of the invention, the solid lines illustrating the boom in one lateral position in the bulk solid material container and the broken lines illustrating the boom in a second lateral position in the container.
Figure 12:
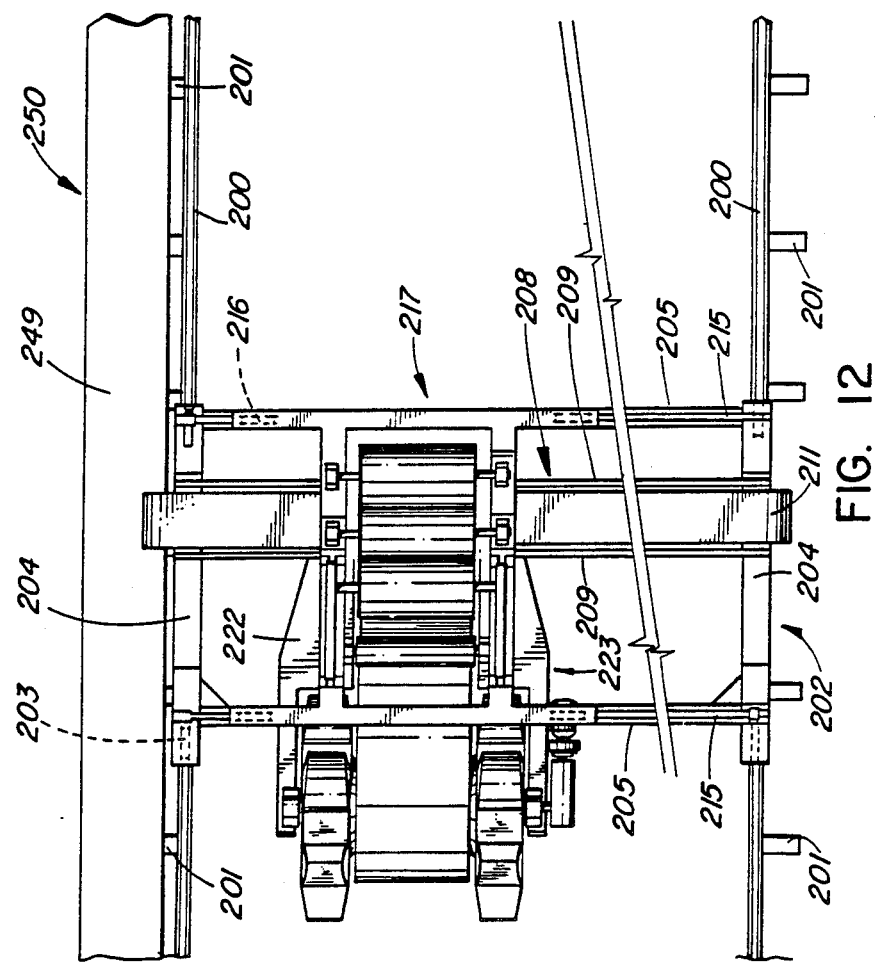
FIG. 12 is a plan view of the third embodiment of the invention, the boom being illustrated in the raised position.

The third embodiment of the reclaiming apparatus, as illustrated in FIGS. 10, 11 and 12, has a pair of gantry-support rails 200 mounted to the structure of the ship by a series of structural supports 201. The gantry, which is generally designated 202, has a series of wheels 203 which ride on rails 200. Gantry 202 has a hollow rectangular construction, being formed of a pair of longitudinal structural members 204 each of which ride above a respective one of the rails 200 on wheels 203 and also being formed of a connecting pair of lateral brace members 205. Connected between the pair of longitudinal structural members 204 is a conveyor belt assembly generally designated as 208 and comprised of lateral support rails 209, rollers 210, and an endless belt 211; a motor (not shown) drives endless belt 211.

Mounted on each of the lateral brace members 205 is a respective rail 215 on which ride the wheels 216 of a boom support structure generally designated as 217. As with the wheels 203, the wheels 216 are connected through mechanical drive means (not shown) to motors which are under the control of the operator of the reclaiming apparatus. Thus, boom support structure 217 may assume any desired position above the bulk solid material container. Boom support structure 217 has a pair of longitudinal structural members 218 extending above the lateral brace members 205 of gantry 202, and also has a connecting pair of lateral brace members 219. A portion of each of the lateral brace members 219 extend downwardly and supports an axle 221 to which is pivotally connected one of the lateral arms 222 of a boom member generally designated 223. As can be seen in FIG. 10, that portion of each of the lateral brace members 219 that extends downwardly has an aperture through which extends the conveyor belt assembly 208. Boom support structure 217 is capable of being positioned anywhere along the length of conveyor belt assembly 208.

A pair of hydraulic piston members 225 each extend between a respective one of the lateral brace members 219 of boom support structure 217 and a respective one of the lateral arms 222 of boom member 223. By actuating hydraulic piston members 225, the operator of the reclaiming apparatus may cause the raising or lowering of boom member 223; FIG. 10 illustrates boom member 223 in its lowered position in solid lines, and in its raised position in broken lines. Motor 227 drives through gearbox 228 the bucket digging wheel of boom member 223, which digging wheel is generally designated as 230. A belt 235 which is of the FLEXOWALL ® type described earlier, has compartments defined on its inner surface which are filled with bulk solid material 236 as belt 235 passes between the two annular scoop wheels 237 of digging wheel 230. With reference to FIG. 10, belt 235 is mounted for free rotation on the axle extending through digging wheel 230 and moves in a counter-clockwise direction; digging wheel 230 itself is driven in a clockwise direction around its axle.

In the lowered position of boom member 223, belt 235 can be seen in FIG. 10 to extend around digging wheel 230 around first, central, and second drums 240, 241, and 242, respectively, and around a third drum 243 and a fourth drum 244. Drums 243 and 244 are mounted between the lateral arms 222 of boom member 223 to freely rotate as belt 235 moves past them. Belt 235 is driven by the rotation of central drum 241 which has a motor (not shown) connected to it through a gear box (not shown). Bulk solid material carried in the compartments of belt 235 is emptied from those compartments as the compartments move between first drum 240 and central drum 241. The material falls onto conveyor belt assembly 208 and is transported on belt 211 to the belt 249 of a second conveyor belt assembly 250, which assembly 250 extends longitudinally beside the container; on a ship, second conveyor belt assembly 250 would extend longitudinally along one side of the ship beside the holds.

Second drum 242 has the opposite ends of its axle mounted for rotation in blocks 252 each of which can slide in a track defined in a respective one of the lateral brace members 219 of boom support structure 217. The track is defined in each lateral brace member 219 such that second drum 242 slides along a path extending through the axis of rotation of first drum 240. Extending between each block 252 and the respective lateral brace member 219 is a hydraulic piston member 253, as illustrated in FIG. 10. The hydraulic fluid pressure within hydraulic piston members 253 is selectively adjustable and determines the tension experienced on belt 235; if the tension is momentarily reduced on belt 235, hydraulic piston members 253 contract slightly to return the original tension to belt 235. This arrangement has particular application when boom member 223 is raised since the distance between second drum 242 and third drum 243 is less in the lowered position; the forward movement of second drum 242 removes the slack that would otherwise be created in belt 235 by the raising of boom member 223. As with the preferred embodiment of the principal disclosure, a double series of rollers 260 is provided for supporting belt 235 in its passage around the pivoted end of boom member 223 when boom member 223 is in the raised position. Each roller of each of the series of rollers 260 would be pivotally mounted to a respective one of the lateral arms 222 of boom member 223.

Although the third embodiment of the reclaimer apparatus has a lateral translation movement rather than a rotational movement as in the first and second embodiments, the third embodiment does operate in a similar manner to the other two embodiments in gathering bulk solid material from a container. As can be seen in FIG. 11, the boom member 223 is configured such that in its lowered position the profile of the boom member closely corresponds to the shape of the side of the container in which it sits. The container can thus be more completely cleaned by the third embodiment of the reclaimer apparatus, with an attendant reduction in the time required for cleaning of residual material from the container by other means.

With its multiple degress of freedom, the apparatus of the invention is capable of cleaning the hold or holds of a ship to a greater extent than has been possible with other apparati. In consequence, less residual material is left to be cleaned from the holds by slow conventional methods subsequent to use of the apparatus. The resultant saving in unloading time is appreciable.

I claim:

1. An apparatus for reclaiming bulk solid material from a storage container, the apparatus comprising:

a gantry adapted to be mounted on a first track proximate of the top of the container for moving across the container in a desired direction;

a boom support structure mounted on said gantry for movement relative thereto;

a boom pivotally mounted at its one end to the boom support structure for pivotal motion relative thereto around a horizontal axis, the boom capable of extending at a selective upward or downward angle from the boom support structure; and a rotatable first drum mounted to the other end of the boom, said first drum including a pair of annular members each extending inwardly from opposing ends of said first drum;

a belt encircling the boom longitudinally and supported in its passage around the other end of the boom by said rotatable first drum, the belt having a pair of flexible side members extending along its inner surface generally perpendicular to that inner surface, each flexible side member extending parallel to but spaced from a respective edge of the belt, the belt being supported in its movement around the first drum by said pair of annular members which extend from opposite ends of the first drum, that edge portion of the inner surface of the belt extending between a flexible side member and the respective edge of the belt riding on a respective one of the annular members during movement of the belt around the first drum, a series of slat members extending between the flexible side members and projecting outwardly from the inner surface of the belt in spaced relation to each other so as to form a series of compartments along the inner surface of the belt; and, scoop means rotatably secured to the other end of the boom at a position laterally offset from the belt, material gathered by the scoop means during its rotation being deposited on the inner surface of the belt as the belt moves around the drum on the other end of the boom, the material being retained in the compartments along the inner surface of the belt as the belt moves along the boom, and said belt further being supported in its passage around the one end of the boom by a further rotatable drum assembly mounted on the boom support structure and comprising second and third drums each having a pair of annular members extending from its opposite ends for supporting the belt, each edge portion of the inner surface of the belt extending between the flexible side member and the respective edge of the belt riding on a respective one of the annular members of each of the second and third drums during movement of the belt around those drums, the second and third drums being constructed and arranged on the boom support structure such that material retained in a compartment along the inner surface of the belt is emptied from that compartment as the compartment moves between the second and third drums, and wherein one of said second and third drums is movably mounted on the boom support structure relative to the other drum, the position of said one drum relative to the other drum varying with the relative position between the boom and the boom support structure, and means applying a force of desired magnitude continuously to said one drum to create a generally constant amount of tension on the belt for all positions of the boom relative to the boom support structure.

2. Apparatus according to claim 1 wherein said drum assembly also includes a central drum mounted to the boom support structure between the second and third drums with the belt wrapping around said central drum with its compartments directed downwardly to enhance removal of material from said compartments.

3. An apparatus for reclaiming bulk solid material from a storage container, the apparatus comprising:

a gantry adapted to be mounted on a first track proximate of the top of the container for moving across the container in a desired direction;

a boom support structure mounted on said gantry for movement relative thereto;

a boom pivotally mounted at its one end to the boom support structure for pivotal motion relative thereto around a horizontal axis, the boom capable of extending at a selective upward or downward angle from the boom support structure; and a rotatable first drum mounted to the other end of the boom, said first drum including a pair of annular members each extending inwardly from opposing ends of said first drum;

a belt encircling the boom longitudinally and supported in its passage around the other end of the boom by said rotatable first drum, the belt having a pair of flexible side members extending along its inner surface generally perpendicular to that inner surface, each flexible side member extending parallel to but spaced from a respective edge of the belt, the belt being supported in its movement around the first drum by said pair of annular members which extend from opposite ends of the first drum, that edge portion of the inner surface of the belt extending between a flexible side member and the respective edge of the belt riding on a respective one of the annular members during movement of the belt around the first drum, a series of slat members extending between the flexible side members and projecting outwardly from the inner surface of the belt in spaced relation to each other so as to form a series of compartments along the inner surface of the belt; and, scoop means rotatably secured to the other end of the boom at a position laterally offset from the belt, material gathered by the scoop means during its rotation being deposited on the inner surface of the belt as the belt moves around the drum on the other end of the boom, the material being retained in the compartments along the inner surface of the belt as the belt moves along the boom, and said belt further being supported in its passage around the one end of the boom by a further rotatable drum assembly mounted on the boom support structure and comprising second and third drums, the second and third drums being constructed and arranged such that material retained in a compartment along the inner surface of the belt is emptied from that compartment as the compartment moves between the second and third drums, said first, second and third drums and said boom and boom support structure together serving to rigidly support said belt for movement in a common plane when in use, with the position and location of said rotatable scoop means being controlled by selecting the orientation and positioning of the boom support structure and the gantry and wherein one of said second and third drums is movably mounted on the boom support structure relative to the other drum, the position of said one drum relative to the other drum varying with the relative position between the boom and the boom support structure, and means applying a force of desired magnitude continuously to said one drum to create a generally constant amount of tension on the belt for all positions of the boom relative to the boom support structure.

4. Apparatus according to claim 3 wherein the second and third drums each have a pair of annular members extending from its opposite ends for supporting the belt, each edge portion of the inner surface of the belt extending between the flexible side member and the respective edge of the belt riding on a respective one of the annular members of each of the second and third drums during movement of the belt around those drums, the drum assembly also having a central drum rotatably mounted to the boom support structure generally between the second and third drums, the outer surface of the belt riding on the central drum in its movement between the second and third drums.

5. An apparatus for reclaiming bulk solid material as in claim 1, 3 or 4 wherein the one end of the boom has a double series of rollers mounted thereon to support the belt in its movement from the other end of the boom to the drum means, each edge portion of the inner surface of the belt extending between the flexible side member and the respective edge of the belt riding on a respective one of the double series of rollers.

6. An apparatus for reclaiming bulk solid material as in any one of claim 1, 3, or 4, and also comprising hydraulic piston means, the hydraulic piston means extending between the boom support structure and the boom, the angle at which the boom extends realtive to the boom support structure being selected by actuation of the hydraulic piston means.

7. Apparatus for reclaiming bulk solid material from a storage container and comprising:
(a) a gantry adapted to move along a container in a desired direction;
(b) a boom support structure mounted to said gantry for movement realtive to said gantry;
(c) a boom pivotally mounted at its one end to the boom support structure for pivotal movement in a generally vertical plane around a horizontal axis, said boom having a bucket wheel rotatable about an axis parallel to said horizontal axis and a first rotatable drum means, both mounted to the other end of said boom;
(d) a plurality of spaced apart second drum means mounted to said boom support structure and defining between them a discharge region for material collected by said bucket wheel;
(e) conveyor means for removing the bulk material away from said discharge region;
(f) a flexible belt extending in a closed loop along said boom and around the first drum means thereon and also around said plurality of second drum means on said boom support structure, said belt defining flexible pockets therealong for receiving bulk material from said bucket wheel and conveying said bulk material along said boom to the region of discharge defined by said second drum means;
(g) means for rotating said bucket wheel independently of the movement of the belt;
(h) said first and second drum means and said boom and boom support structures respectively serving to rigidly constrain said flexible belt for movement in a path in a generally vertical common plane when in use so that the position and location of said vertical plane is closely dependent on the orientations of said gantry and said boom support structure relative to one another during operation and so that the location and movement of the bucket wheel during use can be closely controlled;
(i) and wherein one of said plurality of second drum means on said boom support structure is movably mounted relative to others of said drum means such that its position can vary with variations in the position of the pivotal boom relative to said boom support structure, and means exerting a biasing force of selected magnitude on said one of said plurality of second drum means so that a predetermined degree of tension is maintained in said belt for all operating positions of the boom relative to said boom support structure.

8. Apparatus according to claim 7 wherein said second drum means on said boom support structure comprises a spaced apart pair of rolls with a center roll disposed therebetween, with said belt means wrapping around a substantial part of the center roll with the pockets of the belt facing downwardly as the belt passes around the center roll whereby removal of the bulk material from the belt pockets is enhanced by gravitational and centrifugal forces.

9. Apparatus according to claim 8 wherein said center roll is driven to effect movement of the belt along the path of travel.

10. Apparatus according to claim 7 wherein said boom support structure is mounted to said gantry for rotation relative thereto about a vertical axis.

11. Apparatus according to claim 7 wherein said boom support structure is mounted to said gantry for movement relative thereto in a direction at right angles to the direction of travel of the gantry relative to the container, when in use.

12. Apparatus according to claim 7 including hydraulic cylinder means to pivot said boom relative to said boom support structure.

* * * * *